US012811536B2

(12) United States Patent
Takeuchi

(10) Patent No.: US 12,811,536 B2
(45) Date of Patent: Nov. 24, 2026

(54) MOTOR CONTROL APPARATUS

(71) Applicant: DENSO CORPORATION, Kariya (JP)

(72) Inventor: Ryuta Takeuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 117 days.

(21) Appl. No.: 18/388,355

(22) Filed: Nov. 9, 2023

(65) Prior Publication Data

US 2024/0079987 A1 Mar. 7, 2024

Related U.S. Application Data

(63) Continuation of application No. PCT/JP2022/015804, filed on Mar. 30, 2022.

(30) Foreign Application Priority Data

May 18, 2021 (JP) ................................ 2021-083889

(51) Int. Cl.

*H02P 8/12* (2006.01)
*E05F 15/70* (2015.01)
*H02P 25/16* (2006.01)
*H02P 29/68* (2016.01)

(52) U.S. Cl.

CPC .............. *H02P 29/68* (2016.02); *E05F 15/70* (2015.01); *E05Y 2400/304* (2024.05); *E05Y 2400/306* (2024.05); *E05Y 2400/42* (2013.01); *E05Y 2400/44* (2013.01); *E05Y 2900/55* (2013.01)

(58) Field of Classification Search

CPC .. H02P 21/50; H02P 2201/09; H02P 2203/09; H02P 23/0027; H02P 23/08; H02P 23/28; H02P 29/026; H02P 3/025; H02P 5/00; H02P 6/04; H02P 6/21; H02P 7/04; H02P 7/05; H02P 7/08; H02P 8/10; H02P 8/12

See application file for complete search history.

(56) References Cited

U.S. PATENT DOCUMENTS 5,488,276 A * 1/1996 Nishibe ................ H02H 7/0851 318/473
2006/0229781 A1 10/2006 Nishimura et al.
2006/0290310 A1* 12/2006 Sumiya ................... H02P 29/60 318/471
2014/0145666 A1* 5/2014 Swanson ................. E05B 81/62 318/504
2016/0329844 A1 11/2016 Sato et al.
2020/0355012 A1 11/2020 Kojima

FOREIGN PATENT DOCUMENTS

JP 2009-068175 A 4/2009
JP 2012-057373 A 3/2012
JP 2021-046170 A 3/2021

* cited by examiner

*Primary Examiner* — David Luo
*Assistant Examiner* — Charles S Laughlin
(74) *Attorney, Agent, or Firm* — Oliff PLC

(57) ABSTRACT

A motor control apparatus includes a control unit that controls drive of each of a plurality of motors on the basis of electric power supply from a battery. The control unit includes a heat generation management unit that controls the drive of each of the plurality of motors so that a temperature of elements constituting the control unit does not exceed a heat resistance upper limit.

2 Claims, 7 Drawing Sheets

MOTOR CONTROL APPARATUS

CROSS-REFERENCE TO RELATED APPLICATIONS

The present application is a continuation application of International Application No. PCT/JP2022/015804 filed on Mar. 30, 2022, which is based on and claims priority from Japanese Patent Application No. 2021-083889 filed on May 18, 2021. The entire contents of these applications are incorporated by reference into the present application.

BACKGROUND

1 Technical Field

The present disclosure relates to motor control apparatuses.

2 Description of Related Art

There are known motor control apparatuses for a vehicle. In the vehicle, there are provided a plurality of motors each corresponding to one of a plurality of window glasses. Moreover, for each of the motors, there is installed a corresponding one of the motor control apparatuses. Each motor control apparatus controls drive of the corresponding motor.

SUMMARY

A motor control apparatus according to the present disclosure includes a control unit that controls drive of each of a plurality of motors on the basis of electric power supply from an electric power source. The control unit includes a heat generation management unit that controls the drive of each of the plurality of motors so that a temperature of elements constituting the control unit does not exceed a heat resistance upper limit.

DESCRIPTION OF EMBODIMENTS

Figure 1:
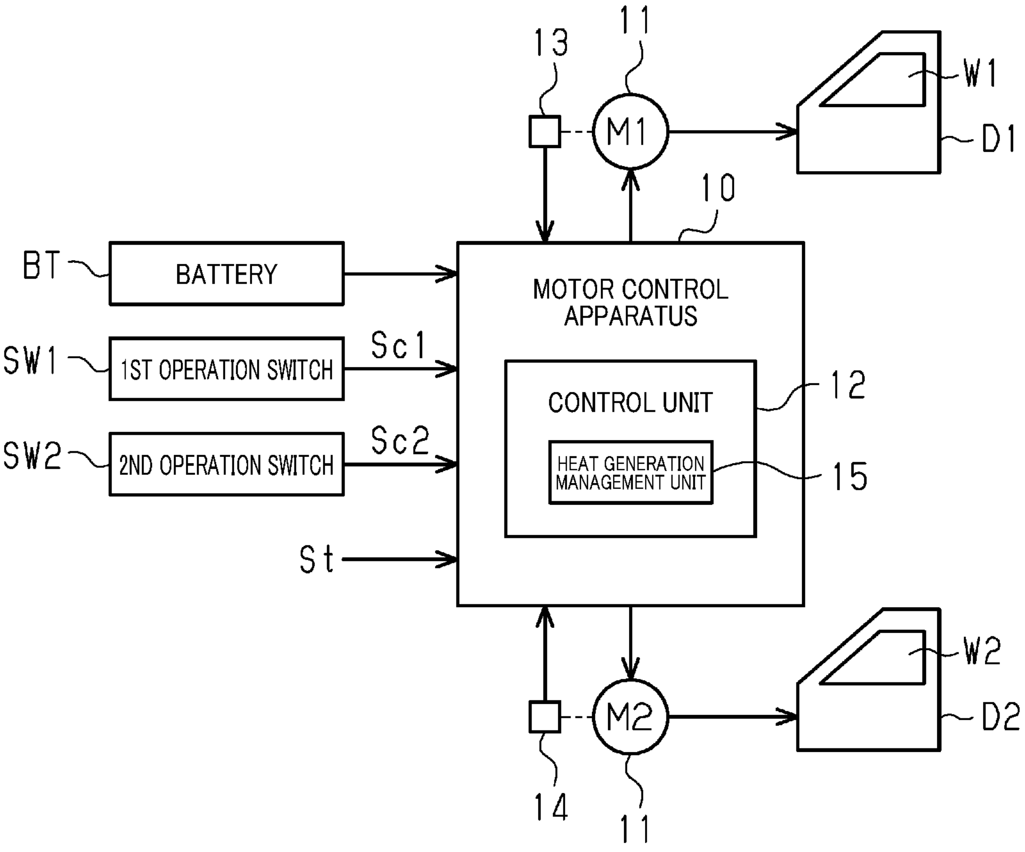
FIG. 1 is a schematic configuration diagram of a system which includes a motor control apparatus according to a first embodiment.

According to the above-described related art (see, for example, Japanese Unexamined Patent Application Publication No. JP2009068175A), one motor control apparatus is required for each of the motors, which poses a problem of increasing the number of parts and thus the manufacturing cost.

In contrast, with the configuration of the above-described motor control apparatus according to the present disclosure, the plurality of motors can be controlled by the single motor control apparatus. Therefore, in constructing a system that controls the plurality of motors, it is unnecessary to provide one motor control apparatus for each of the plurality of motors. Accordingly, it is possible to suppress the number of parts of the system; thus, it is also possible to suppress the cost of constructing the system. Moreover, with the reduction in the number of motor control apparatuses, the installation space of the system can also be reduced.

Furthermore, when the plurality of motors are driven simultaneously, electric current flowing through the control unit increases according to the number of the motors being driven; therefore, the elements constituting the control unit may be burnt out due to high current. In this regard, with the configuration of the motor control apparatus according to the present disclosure, the heat generation management unit controls the drive of each of the plurality of motors so that the temperature of the elements constituting the control unit does not exceed the heat resistance upper limit. Consequently, even when the plurality of motors are driven simultaneously, the elements constituting the control unit can be prevented, by the heat generation management unit, from being burnt out.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, descriptions of identical components will not be repeated.

First Embodiment

Hereinafter, a first embodiment of the motor control apparatus according to the present disclosure will be described.

As shown in FIG. 1, a motor control apparatus 10 is configured as, for example, a control apparatus that controls a plurality of motors 11 installed in a vehicle. The number of the motors 11 is, for example, two. Hereinafter, one of the two motors 11 will be referred to as the first motor M1; and the other of the two motors 11 will be referred to as the second motor M2.

In the present embodiment, the motor control apparatus 10 is, for example, a power window ECU. The first motor M1 is, for example, a motor that drives a window glass W1 of a front-seat door D1. The first motor M1 is provided in the front-seat door D1. Moreover, the first motor M1 is connected, in the front-seat door D1, with the window glass W1 via a regulator (not shown) or the like. The window glass W1 is driven by the first motor M1 to move up and down.

The second motor M2 is, for example, a motor that drives a window glass W2 of a rear-seat door D2. The second motor M2 is provided in the rear-seat door D2. Moreover, the second motor M2 is connected, in the rear-seat door D2, with the window glass W2 via a regulator (not shown) or the like. The window glass W2 is driven by the second motor M2 to move up and down. In addition, the front-seat door D1 and the rear-seat door D2 are, for example, doors that are aligned with each other in a longitudinal direction of the vehicle on either the right side or the left side in the vehicle.

The motor control apparatus 10 may be arranged in either of the front-seat door D1 and the rear-seat door D2, or arranged at a location other than the front-seat door D1 and the rear-seat door D2 in the vehicle.

(Configuration of Motor Control Apparatus 10)

The motor control apparatus 10 includes a control unit 12 that controls each of the first motor M1 and the second motor M2. The control unit 12 is constituted of a microcomputer, a drive circuit and/or the like. The control unit 12 is supplied with electric power from an in-vehicle battery BT that serves as an electric power source. The control unit 12 is capable of performing PWM control that adjusts a drive voltage applied to each motor 11 by varying a duty ratio of the drive circuit.

The control unit 12 may be configured as a circuitry that includes: 1) one or more processors that execute various processes in accordance with computer programs (i.e., software); 2) one or more dedicated hardware circuits such as an application-specific integrated circuit (i.e., ASIC) that executes at least some of the various processes; or 3) a combination thereof. A processor includes a CPU and a memory such as a RAM or ROM. The memory stores program codes or instructions which are configured to cause the CPU to execute processes. In addition, memories, namely, computer-readable media include any available media that can be accessed by a general-purpose or dedicated computer.

The control unit 12 acquires necessary vehicle information from a superordinate body ECU (not shown). The vehicle information may include, for example, an on/off signal of a well-known ignition switch provided in the vehicle and outside air temperature information St detected by an outside air temperature sensor installed in the vehicle.

A first drive command Sc1, which is a drive command for the first motor M1, is inputted to the control unit 12 by operation of a first operation switch SW1. Upon detection of the first drive command Sc1, the control unit 12 starts drive of the first motor M1. Moreover, a second drive command Sc2, which is a drive command for the second motor M2, is inputted to the control unit 12 by operation of a second operation switch SW2. Upon detection of the second drive command Sc2, the control unit 12 starts drive of the second motor M2.

Rotation detection signals outputted from a first rotation sensor 13 and a second rotation sensor 14 are inputted to the control unit 12. The first rotation sensor 13 is provided integrally with the first motor M1 to detect rotation of the first motor M1. The second rotation sensor 14 is provided integrally with the second motor M2 to detect rotation of the second motor M2. The rotation detection signals outputted from the first rotation sensor 13 and the second rotation sensor 14 are, for example, pulse signals. The control unit 12 detects the rotational speeds of the first motor M1 and the second motor M2 based on the rotation detection signals. Moreover, the control unit 12 also detects the open/closed positions of the window glasses W1 and W2 based on the rotation detection signals.

For each of the first motor M1 and the second motor M2, the rotational speed of the motor may drop significantly when a high load is imposed thereon during drive thereof. In addition, in the following explanation, the phenomenon in which the rotational speed of the first motor M1 or the second motor M2 drops significantly due to a load will be expressed as "the first motor M1 or the second motor M2 is locked", or be referred to as "the lock of the first motor M1 or the second motor M2".

For example, when the window glasses W1 and W2 reach fully-closed positions thereof during a closing operation, upper ends of the window glasses W1 and W2 are brought into contact with respective window frames. Then, the first motor M1 and the second motor M2 are locked respectively by the loads of the contacts between the upper ends of the window glasses W1 and W2 and the respective window frames.

The control unit 12 detects the lock of the first motor M1 based on drive information of the first motor M1. The drive information of the first motor M1 may be, for example, variation in the rotational speed of the first motor M1. Upon detection of the lock of the first motor M1, the control unit 12 starts counting time from that time point. Hereinafter, the drive time of the first motor M1 in the locked state thereof will be referred to as "the lock time of the first motor M1".

Similarly, the control unit 12 detects the lock of the second motor M2 based on drive information of the second motor M2. The drive information of the second motor M2 may be, for example, variation in the rotational speed of the second motor M2. Upon detection of the lock of the second motor M2, the control unit 12 starts counting time from that time point. Hereinafter, the drive time of the second motor M2 in the locked state thereof will be referred to as "the lock time of the second motor M2". In addition, in order to minimize the gaps between the upper ends of the window glasses W1 and W2 and the respective window frames, it is necessary to secure, for each of the first motor M1 and the second motor M2, a predetermined length of the lock time without stopping the drive thereof immediately after detection of the lock thereof.

(Heat Generation Management Unit 15)

The control unit 12 includes a heat generation management unit 15. The heat generation management unit 15 controls drive of each of the first motor M1 and the second motor M2 so that the temperature of elements constituting the control unit 12 does not exceed a heat resistance upper limit.

Specifically, the heat generation management unit 15 calculates a heat generation level value ΣL based on the lock times of the motors 11. Moreover, when the heat generation level value ΣL has become greater than or equal to a preset allowable time Tx, the heat generation management unit 15 stops the drive of at least one of the motors 11 whose lock has been detected. For example, when the heat generation level value ΣL has become greater than or equal to the allowable time Tx, the heat generation management unit 15 continues only the drive of the motor 11 whose lock was detected last among the plurality of motors 11 and stops the drive of the remainder of the plurality of motors 11.

(Regarding Calculation of Heat Generation Level Value ΣL)

The heat generation management unit 15 calculates the heat generation level value ΣL using the following Equation (a).

$$\Sigma L = T1\times 1 + T2\times 2\times 3 + \ldots + Tn\times n\times(2n-1) \quad \text{(a)}$$

In the above Equation (a), n is the number of motors 11 in the locked state. Moreover, Tn is the time during which n motors 11 are in the locked state. That is, T1 is the time during which only one motor 11 is in the locked state; and T2 is the time during which two motors 11 are together in the locked state. Furthermore, (2n−1) in the above Equation (a) is a weighting coefficient C. That is, in present embodiment, the weighting coefficient C is a value that increases with increase in the number n of motors 11 in the locked state. In other words, the process using the above Equation (a) including the weighting coefficient C can be regarded as a process of decreasing the allowable time Tx with increase in the number n of motors 11 in the locked state.

Figure 2:
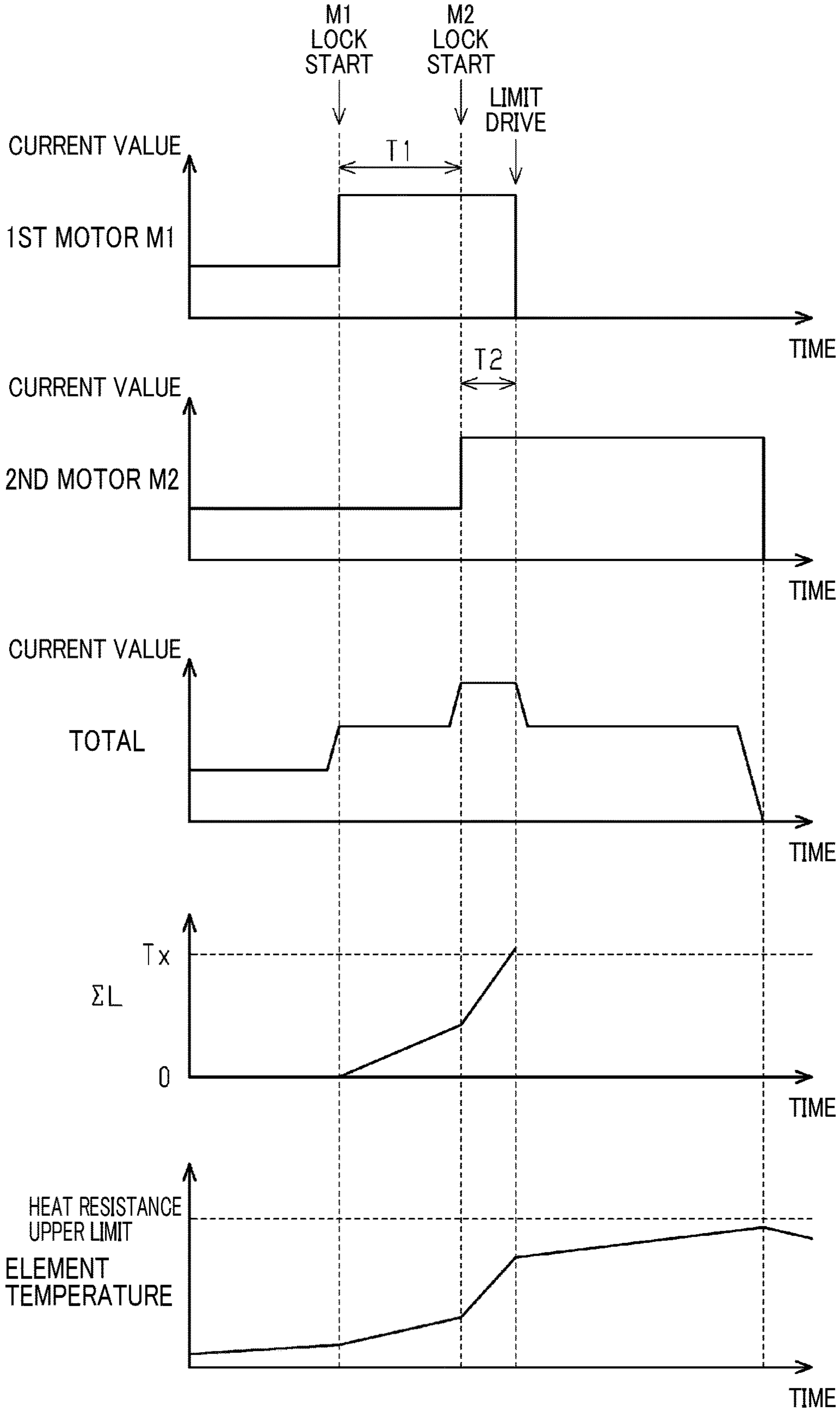
FIG. 2 is a time chart for explaining a processing mode of a control unit according to the first embodiment.

FIG. 2 illustrates, as an example, the process performed by the heat generation management unit 15 when the lock of the second motor M2 is started during the lock of the first motor M1. First, with the window glass W1 being fully closed, the lock of the first motor M1 is detected during the closing operation. The heat generation management unit 15 starts counting the time T1 upon the detection of the lock of the first motor M1. As mentioned above, the time T1 is the time during which only the first motor M1 is in the locked state, i.e., the time from when the lock of the first motor M1 is detected until the lock of the second motor M2 is detected.

Upon the first motor M1 being locked, electric current flowing through the first motor M1 increases. Moreover, when only the first motor M1 is locked, the time T1 directly represents the heat generation level value IL. Thereafter, upon detecting the lock of the second motor M2 during the lock of the first motor M1, the heat generation management unit 15 starts counting the time T2. Upon the second motor M2 being locked, electric current flowing through the second motor M2 increases. That is, when both the first motor M1 and the second motor M2 are locked, the total value of the electric current flowing through the first motor M1 and the electric current flowing through the second motor M2 becomes high. Consequently, when both the first motor M1 and the second motor M2 are locked, the temperature of the elements constituting the control unit 12 increases more significantly.

At this time, the heat generation level value ΣL becomes such that $\Sigma L = T1 \times 1 + T2 \times 2 \times 3$. Moreover, the drive of each of the first motor M1 and the second motor M2 in the locked state is maintained until the heat generation level value ΣL becomes greater than or equal to the allowable time Tx.

The allowable time Tx is set to a predetermined value in advance. More particularly, the allowable time Tx is set to a time long enough to fully close the window glasses W1 and W2 without any gaps. For example, the allowable time Tx may be set to 100 [ms]. In this case, if the time T1 is 50 [ms], then the heat generation level value ΣL becomes equal to 104, i.e., becomes greater than the allowable time Tx when the time T2 becomes equal to 9 [ms].

The heat generation management unit 15 performs a heat generation suppression process when the heat generation level value ΣL has become greater than or equal to the allowable time Tx. In the heat generation suppression process, the heat generation management unit 15 continues only the drive of the motor 11 whose lock was detected last among the plurality of motors 11 (i.e., only the drive of the second motor M2 in the above example) and stops the drive of the remainder of the plurality of motors 11 (i.e., the drive of the first motor M1 in the above example). In this manner, the heat generation management unit 15 limits the lock time of the first motor M1 when the heat generation level value ΣL has become greater than or equal to the allowable time Tx. In the above example, the lock time of the first motor M1 is limited to T1+T2=59 [ms].

Furthermore, in the heat generation suppression process, the drive of the second motor M2 is continued until the lock time reaches the allowable time Tx. Consequently, the lock time of the second motor M2 becomes a time long enough to fully close the window glass W2 without any gaps. As described above, the lock time of the first motor M1 is limited by the heat generation suppression process, so that the temperature of the elements constituting the control unit 12 does not exceed the heat resistance upper limit.

In addition, when only one motor 11 is locked, the time T1 directly represents the heat generation level value IL. Therefore, the drive of the motor 11 in the locked state is continued until the time T1 reaches the allowable time Tx, and then is stopped. In the above example, if no lock of the second motor M2 is detected during the lock of the first motor M1, the lock time of the first motor M1 can be continued until it reaches the allowable time Tx=100 [ms].

Next, a control flow of the control unit 12 and its effects in the first embodiment will be described.

Figure 3:
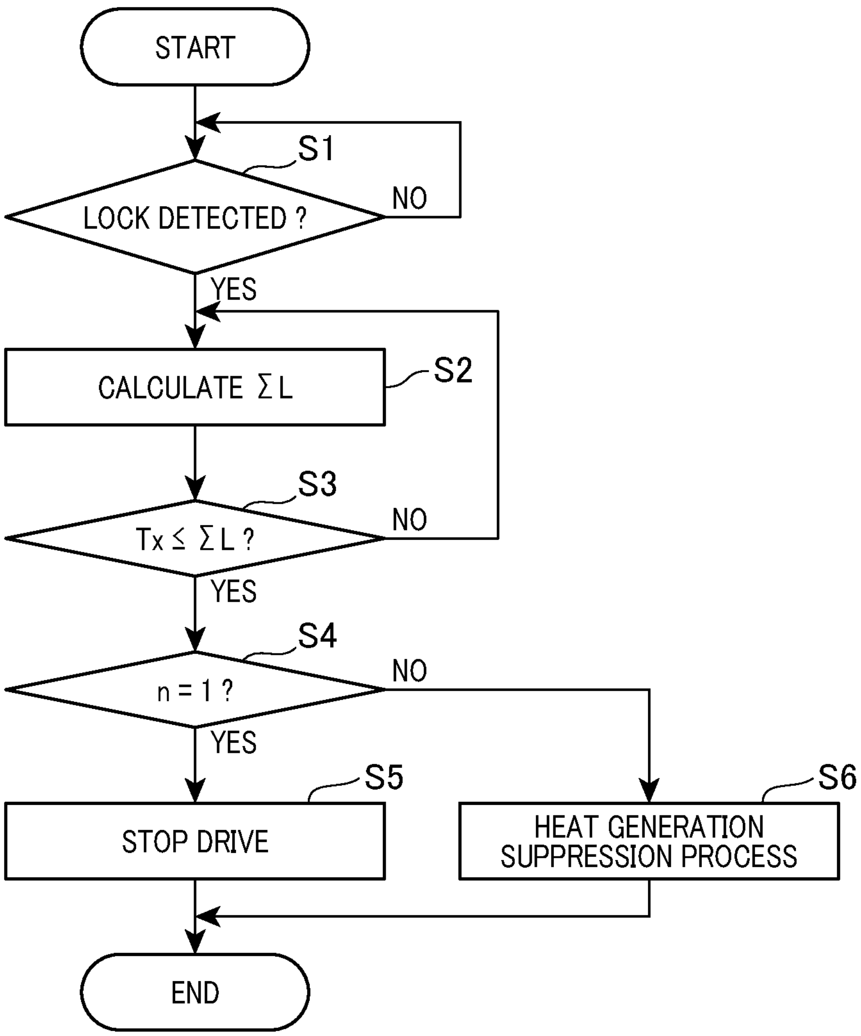
FIG. 3 is a flowchart for explaining a process performed by the control unit according to the first embodiment.

As shown in FIG. 3, the control unit 12 determines, for each of the first motor M1 and the second motor M2, whether the drive of the motor is locked. If it is determined in step S1 that the drive of the motor is not locked, the control unit 12 repeats step S1.

In contrast, if it is determined in step S1 that the drive of the motor is locked, the control flow proceeds to step S2. In step S2, the heat generation management unit 15 calculates the heat generation level value ΣL based on the above Equation (a).

In subsequent step S3, the heat generation management unit 15 compares the heat generation level value ΣL calculated in step S2 with the allowable time Tx. If the heat generation level value ΣL is less than the allowable time Tx, the control flow returns to step S2 in which the heat generation management unit 15 calculates the heat generation level value ΣL again based on the increased lock time. Consequently, the heat generation level value ΣL increases with increase in the lock time.

In step S3, if the heat generation level value ΣL is greater than or equal to the allowable time Tx, the control flow proceeds to step S4. In step S4, the heat generation management unit 15 determines whether the number n of motors 11 in the locked state is one.

In step S4, if the number n of motors 11 in the locked state is one, the control flow proceeds to step S5. In step S5, the heat generation management unit 15 stops the drive of the one motor 11 in the locked state.

In step S4, if the number n of motors 11 in the locked state is plural, the control flow proceeds to step S6. In step S6, the heat generation management unit 15 executes the heat generation suppression process. By the heat generation suppression process, of the plurality of motors 11 in the locked state, only the drive of the motor 11 whose lock was detected last is continued for the allowable time Tx and the drive of the remaining motor(s) 11 is stopped. Consequently, even though the plurality of motors 11 are locked, the temperature of the elements constituting the control unit 12 is prevented from exceeding the heat resistance upper limit. In addition, in the case where both the lock of the first motor M1 and the lock of the second motor M2 are detected at the same time, only the drive of either of the first motor M1 and the second motor M2 is continued in the heat generation suppression process.

Advantageous effects of the first embodiment will be described.

(1-1) The control unit 12 includes the heat generation management unit 15 that controls the drive of each of the plurality of motors 11 so that the temperature of the elements constituting the control unit 12 does not exceed the heat resistance upper limit. With the above configuration, the plurality of motors 11 can be controlled by the single motor control apparatus 10. Therefore, in constructing a system that controls the plurality of motors 11, it is unnecessary to provide one motor control apparatus 10 for each of the plurality of motors 11. Accordingly, it is possible to suppress the number of motor control apparatuses 10 in the system that controls the plurality of motors 11; thus, it is also possible to suppress the cost of constructing the system. Moreover, with the reduction in the number of motor control apparatuses 10, the installation space of the system can also be reduced.

Furthermore, when the plurality of motors 11 are driven simultaneously, electric current flowing through the control unit 12 increases according to the number n of the motors 11 being driven; therefore, the elements constituting the control unit 12 may be burnt out due to high current. In this regard, with the above configuration, the heat generation management unit 15 controls the drive of each of the plurality of motors 11 so that the temperature of the elements constituting the control unit 12 does not exceed the heat resistance upper limit. Consequently, even when the plurality of motors 11 are driven simultaneously, the elements constituting the control unit 12 can be prevented, by the heat generation management unit 15, from being burnt out.

(1-2) The control unit 12 detects the lock of each of the motors 11 based on the drive information of the motor 11. Moreover, when the lock of two or more of the motors 11 is detected, the heat generation management unit 15 limits the lock time that is the drive time of these motors 11 in the locked state. Consequently, with the heat generation management unit 15 limiting the lock time of the motors 11, it becomes possible to prevent the temperature of the elements constituting the control unit 12 from exceeding the heat resistance upper limit.

(1-3) The heat generation management unit 15 calculates the heat generation level value ΣL based on the lock time of each of those motors 11 whose lock has been detected. Moreover, when the heat generation level value ΣL has become greater than or equal to the preset allowable time Tx, the heat generation management unit 15 stops the drive of at least one of those motors 11 whose lock has been detected. Consequently, it becomes possible to limit the lock time of the motors 11 based on the comparison between the heat generation level value ΣL and the preset allowable time Tx.

(1-4) When the heat generation level value ΣL has become greater than or equal to the allowable time Tx, the heat generation management unit 15 continues only the drive of the motor 11 whose lock was detected last among those motors 11 whose lock has been detected, and stops the drive of the remainder of those motors 11 whose lock has been detected. Consequently, the lock time of the motor 11 whose lock was detected last can be secured; thus, the motors 11 can be controlled so as to prevent the lock time of any of the motors 11 from becoming extremely short.

(1-5) The heat generation management unit 15 detects the number n of the motors 11 in the locked state. Moreover, the heat generation management unit 15 performs control of decreasing the allowable time Tx with increase in the number n of the motors 11 in the locked state. With the above configuration, it is possible to suitably control the temperature of the elements constituting the control unit 12 so as to prevent the temperature from exceeding the heat resistance upper limit.

Second Embodiment

Next, a second embodiment of the motor control apparatus according to the present disclosure will be described. It should be noted that the second embodiment differs from the first embodiment only in the control mode of the heat generation management unit 15. Therefore, only the control mode of the heat generation management unit 15 in the second embodiment will be described hereinafter.

In the second embodiment, the heat generation management unit 15 calculates a heat generation degree in each of the motors 11. More particularly, in present embodiment, the heat generation degree in each of the motors 11 is represented by, for example, an estimated value of electric current supplied to the motor 11. Moreover, for each of the motors 11, the electric current supplied to the motor 11 can be estimated based on at least one of the voltage of the battery BT, the outside air temperature information St and the rotational speed of the motor 11. It should be noted that the heat generation degree in each of the motors 11 may alternatively be represented by an estimated value of the amount of heat generated in the motor 11. Moreover, for each of the motors 11, the amount of heat generated in the motor 11 can be estimated based on at least one of the voltage of the battery BT, the outside air temperature information St and the rotational speed of the motor 11. In the present embodiment, when the total value FL of the heat generation degrees in the motors 11 has become greater than or equal to a preset allowable value Fx, the heat generation management unit 15 performs an output limitation of lowering the drive voltage applied to at least one of the motors 11 which is being driven. In addition, the heat generation management unit 15 adjusts the drive voltage by PWM control.

Figure 4:
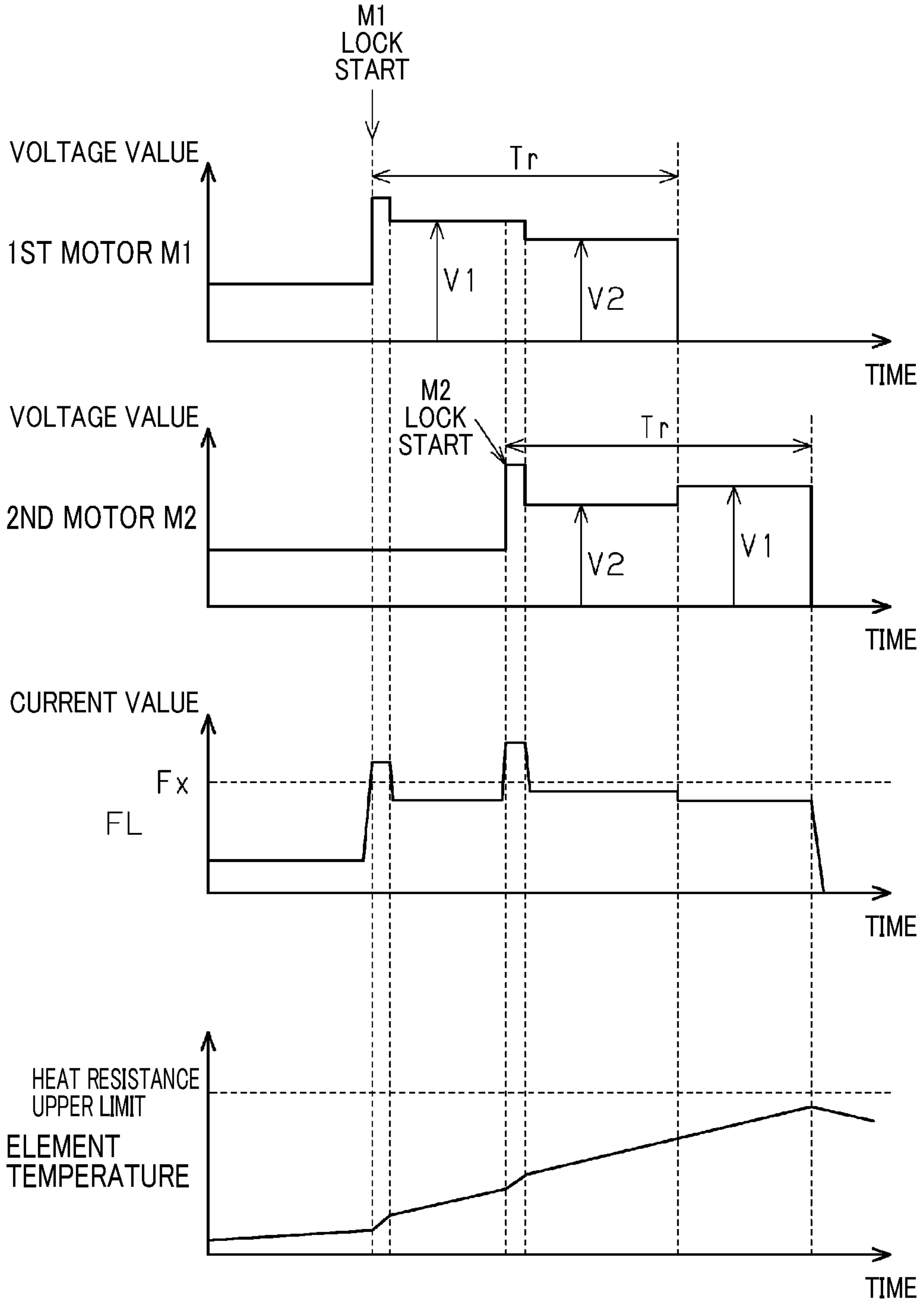
FIG. 4 is a time chart for explaining a processing mode of a control unit according to a second embodiment.

FIG. 4 illustrates, as an example, the process performed by the heat generation management unit 15 when the lock of the second motor M2 is started during the lock of the first motor M1. First, with the window glass W1 being fully closed, the lock of the first motor M1 is detected during the closing operation. The heat generation management unit 15 starts counting the time T1 upon the detection of the lock of the first motor M1.

Upon the first motor M1 being locked, electric current flowing through the first motor M1 and thus the heat generation degree of the first motor M1 increase. At this time, if the total value FL has become greater than or equal to the allowable value Fx, the heat generation management unit 15 limits the drive voltage applied to the first motor M1 to a voltage value V1, so as to cause the total value FL to become less than the allowable value Fx.

Thereafter, upon detecting the lock of the second motor M2 during the lock of the first motor M1, the heat generation management unit 15 starts counting the time T2. Upon the second motor M2 being locked, electric current flowing through the second motor M2 and thus the heat generation degree of the second motor M2 increase. Consequently, the total value FL also increases. At this time, if the total value FL has become greater than or equal to the allowable value Fx, the heat generation management unit 15 lowers the drive voltages respectively applied to the first motor M1 and the second motor M2 to a voltage value V2, so as to cause the total value FL to become less than the allowable value Fx. Here, the voltage value V2 is lower than the voltage value V1. In addition, the same voltage value V2 is applied to both the first motor M1 and the second motor M2.

Thereafter, the heat generation management unit 15 stops, based on a predetermined condition, the supply of electric power to the first motor M1. The predetermined condition may be, for example, a condition that the elapsed time from the start of the lock of the first motor M1 reaches a predetermined time Tr, or a condition that stop of the rotation of the first motor M1 is detected. The predetermined time Tr is set to a time long enough to fully close the window glasses W1 and W2 without any gaps.

Upon the drive of the first motor M1 being stopped during the output limitation, the total value FL becomes less than the allowable value Fx. Then, upon the total value FL becoming less than the allowable value Fx, the heat generation management unit 15 increases the drive voltage applied to the second motor M2 to the voltage value V1. Thereafter, upon the elapsed time from the start of the lock of the second motor M2 reaching the predetermined time Tr, the heat generation management unit 15 stops the drive of the second motor M2.

Next, a control flow of the control unit 12 and its effects in the second embodiment will be described.

Figure 5:
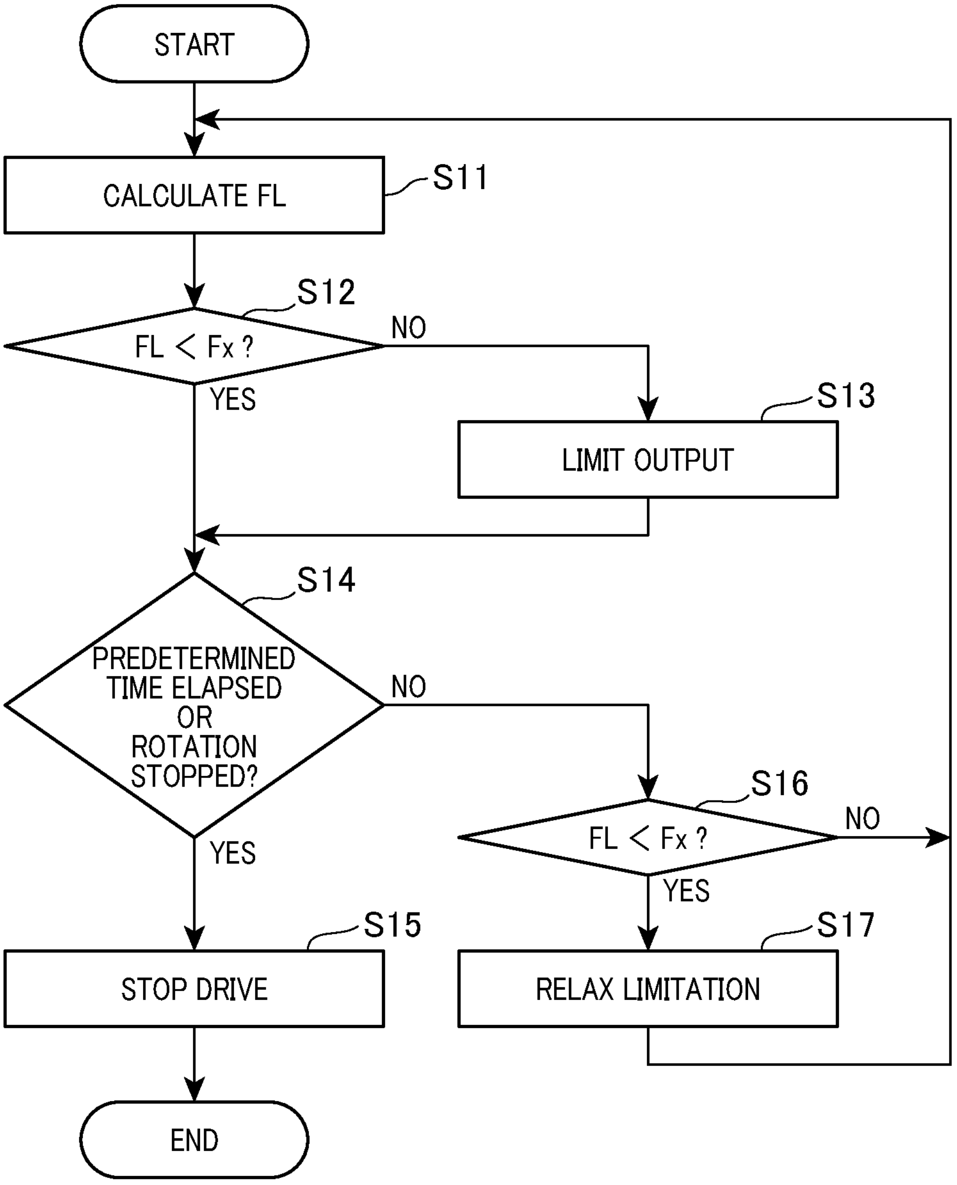
FIG. 5 is a flowchart for explaining a process performed by the control unit according to the second embodiment.

As shown in FIG. 5, during the drive of the motor(s) 11, the heat generation management unit 15 calculates the total value FL in step S11.

In subsequent step S12, the heat generation management unit 15 compares the total value FL calculated in step S11 with the allowable value Fx. In step S12, if the total value FL is greater than or equal to the allowable value Fx, the control flow proceeds to step S14 via step S13. In step S13, the heat generation management unit performs the output limitation of lowering the drive voltage applied to at least one of the motors 11 which is being driven. By the output limitation, the temperature of the elements constituting the control unit 12 is prevented from exceeding the heat resistance upper limit.

In step S12, if the total value FL is less than the allowable value Fx, the control process proceeds directly to step S14, skipping step S13.

In step S14, the heat generation management unit 15 determines whether the lock time of any of the motors 11 has reached the predetermined time Tr. In step S14, if the lock time of any of the motors 11 has reached the predetermined time Tr, the control flow proceeds to step S15. In step S15, the supply of electric power to the motor 11 whose lock time has reached the predetermined time Tr is stopped. It should be noted that the heat generation management unit 15 may alternatively be configured to: determine in step S14 whether the rotation of any of the motors 11 in the locked state has been stopped; and stop in step S15 the supply of electric power to the motor 11 whose rotation has been stopped.

In step S14, if there is no motor 11 whose lock time has reached the predetermined time Tr, the control flow proceeds to step S16 while continuing the supply of electric power to the motor(s) 11. In step S16, the heat generation management unit 15 again calculates the total value FL and compares the total value FL with the allowable value Fx. Here, if the total value FL is greater than or equal to the allowable value Fx, the control process returns to step S11.

In step S16, if the total value FL is less than the allowable value Fx, the control process returns to step S11 via step S17. In step S17, the heat generation management unit 15 relaxes the limitation on the drive voltage of at least one of the motors 11 which is being driven. Consequently, when there is a margin between the total value FL and the allowable value Fx, it is possible to drive the at least one of the motors 11 with the output increased as much as possible by relating the output limitation.

Advantageous effects of the second embodiment will be described.

(2-1) The heat generation management unit 15 calculates the heat generation degree in each of the motors 11. Moreover, when the total value FL of the heat generation degrees in the motors 11 has become greater than or equal to the preset allowable value Fx, the heat generation management unit 15 performs the output limitation of lowering the drive voltage applied to at least one of the motors 11 which is being driven. With the above configuration, even when the plurality of motors 11 are driven simultaneously, the elements constituting the control unit 12 can be prevented, by the output limitation performed by the heat generation management unit 15, from being burnt out. Moreover, with the above configuration, the elements constituting the control unit 12 can be prevented, without limiting the lock time of the motors 11 to be short, from being burnt out. That is, the lock time of the motors 11 can be secured, thereby making it possible to suitably close the window glasses W1 and W2.

(2-2) The heat generation management unit 15 relaxes the output limitation when the total value FL has become less than the allowable value Fx during the output limitation. With the above configuration, it becomes possible to more optimally perform the output limitation according to the total value FL. Consequently, it becomes possible to suppress output shortage when the window glasses W1 and W2 are fully closed.

(2-3) The heat generation management unit 15 calculates the heat generation degree in each of the motors 11 based on at least one of the voltage of the battery BT, the outside air temperature information St and the rotational speed of the motor 11. With the above configuration, the heat generation degree in each of the motors 11 can be estimated without employing additional current sensors for detecting electric currents flowing through the motors 11 and without employing additional temperature sensors mounted to the motors 11 and the motor control apparatus 10.

The above-described embodiments can be modified and implemented as follows. Moreover, the above-described embodiments and the following modifications can also be implemented in combination with each other to the extent that there is no technical contradiction between them.

Modifications of First Embodiment

The value of the allowable time Tx is not limited to 100 [ms] as exemplified in the above-described first embodiment, and can be changed as appropriate depending on the configuration.

In the above-described first embodiment, the weighting coefficient C used to calculate the heat generation level value ΣL is determined only by the number n of motors 11 in the locked state. However, the manner of determining the weighting coefficient C is not particularly limited to the above. For example, the weighting coefficient C may be determined based on, in addition to the number n, at least one of the voltage of the battery BT, the outside air temperature, the rotational speeds of the motors 11 and characteristics (such as outputs) of the motors 11.

In the heat generation suppression process according to the first embodiment, only the drive of the motor 11 whose lock was detected last is continued and the drive of the remaining locked motor(s) 11 is stopped. However, the heat generation suppression process is not particularly limited to the above. For example, when the heat generation level value ΣL has become greater than or equal to the preset allowable time Tx, it may be possible to continue only the drive of the motor 11 whose lock was detected first and stop the drive of the remaining locked motor(s) 11. Alternatively, when the heat generation level value ΣL has become greater than or equal to the preset allowable time Tx, it may be possible to stop the drive of all the locked motors 11.

The process performed by the heat generation management unit 15 is not limited to the manner described in the first embodiment. For example, it is possible to combine the process performed by the heat generation management unit 15 according to the first embodiment and the process performed by the heat generation management unit 15 according to the second embodiment.

Modifications of Second Embodiment

In the above-described second embodiment, the amount of the output limitation by the heat generation management unit 15 may be varied according to, for example, at least one of the number of motors 11 operating simultaneously, the voltage of the battery BT, the outside air temperature, the rotational speeds of the motors 11 and characteristics (such as outputs) of the motors 11.

In the above-described second embodiment, when the total value FL has become greater than or equal to the preset allowable value Fx, the heat generation management unit 15 performs the output limitation of lowering the drive voltage applied to at least one of the motors 11 which is being driven. However, the heat generation management unit 15 may alternatively perform a process as shown in FIGS. 6 and 7.

Figure 6:
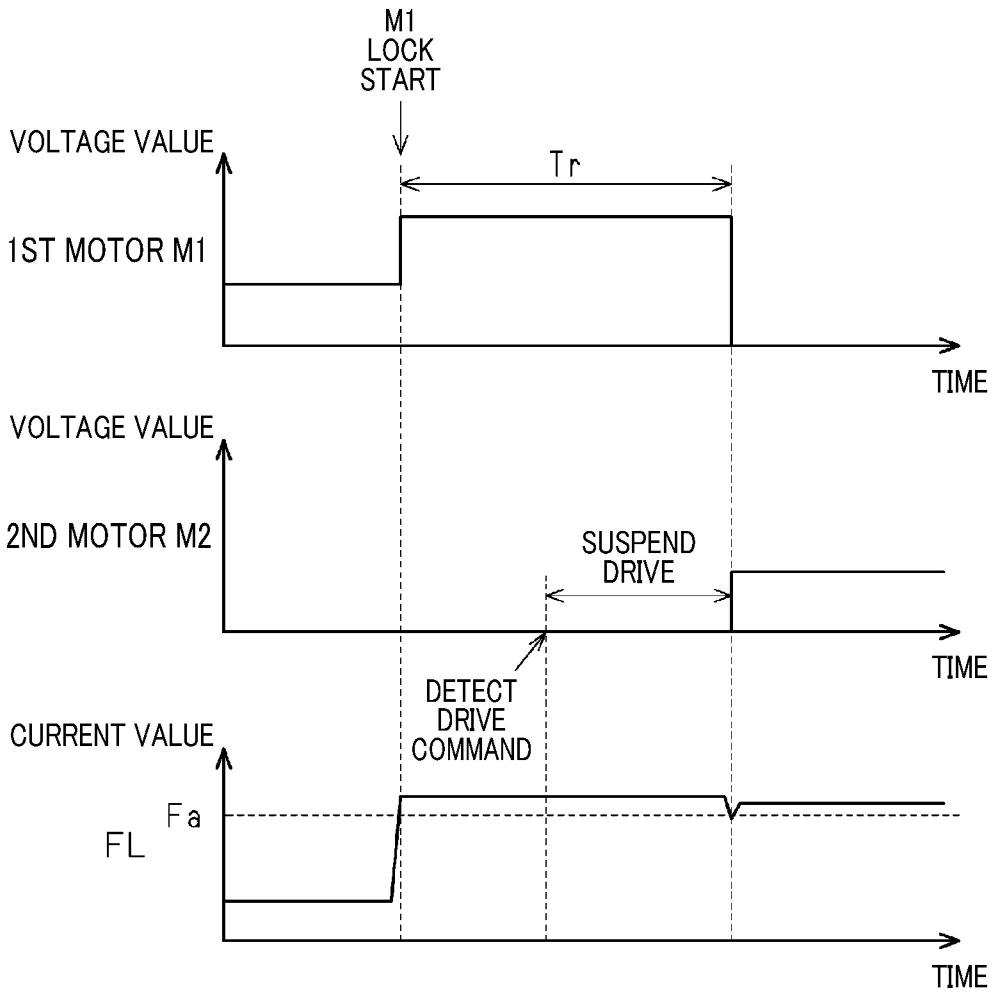
FIG. 6 is a time chart for explaining a processing mode of a control unit according to a modification.
Figure 7:
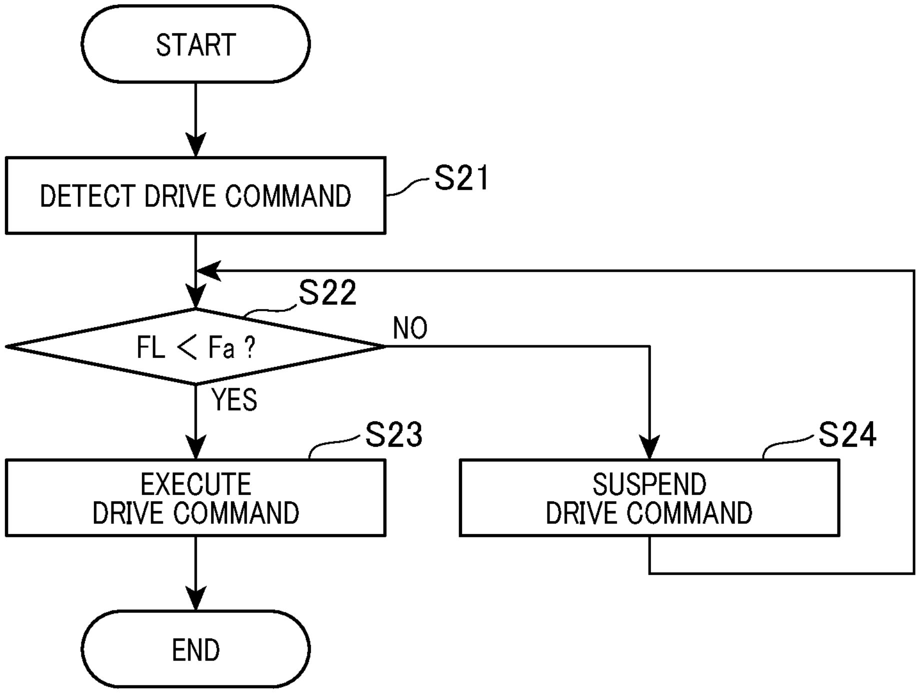
FIG. 7 is a flowchart for explaining a process performed by the control unit according to the modification.

FIG. 6 illustrates, as an example, the alternative process performed by the heat generation management unit 15 when the second drive command Sc2 is inputted during the lock of the first motor M1. First, with the window glass W1 being fully closed, the lock of the first motor M1 is detected during the closing operation. The heat generation management unit 15 starts counting the time T1 upon the detection of the lock of the first motor M1. Upon the first motor M1 being locked, electric current flowing through the first motor M1 and thus the heat generation degree of the first motor M1 increase. Consequently, the total value FL becomes greater than or equal to a preset threshold value Fa.

If the second drive command Sc2 is inputted when the total value FL is greater than or equal to the threshold value Fa, the heat generation management unit suspends the second drive command Sc2. That is, even if the second operation switch SW2 is operated when the total value FL is greater than or equal to the threshold value Fa, the window glass W2 is not operated.

Thereafter, the heat generation management unit 15 stops, based on a predetermined condition, the supply of electric power to the first motor M1. The predetermined condition may be, for example, a condition that the elapsed time from the start of the lock of the first motor M1 reaches the predetermined time Tr, or a condition that stop of the rotation of the first motor M1 is detected.

Upon the drive of the first motor M1 being stopped, the total value FL becomes less than the threshold value Fa. Then, upon the total value FL becoming less than the threshold value Fa, the heat generation management unit 15 executes the suspended second drive command Sc2. Consequently, operation of the second motor M2 is started.

Next, a control flow of the control unit 12 in this modification will be described.

As shown in FIG. 7, if a drive command for one of the motors 11 is detected by the heat generation management unit 15 in step S21, the control flow proceeds to step S22. In step S22, the heat generation management unit 15 calculates the total value FL and compares the total value FL with the threshold value Fa.

In step S22, if the total value FL is less than the threshold value Fa, the control flow proceeds to step S23. In step S23, the heat generation management unit drives the one of the motors 11 based on the drive command detected in step S21.

In step S22, if the total value FL is greater than or equal to the threshold value Fa, the control flow proceeds to step S24. In step S24, the detected drive command is suspended. That is, drive of the one of the motors 11 based on the detected drive command is not performed. After the execution of step S24, the control flow returns to step S22.

With the above process, when a drive command for one of the motors 11 is detected with the total value FL being greater than or equal to the threshold value Fa, the heat generation management unit 15 suspends the drive command. Thereafter, upon the total value FL becoming less than the threshold value Fa, the heat generation management unit 15 executes the suspended drive command. That is, when the total value FL of the heat generation degrees in the motors 11 is greater than or equal to the threshold value Fa, drive of a further one of the motors 11 is not started. Therefore, it is possible to control the temperature of the elements constituting the control unit 12 so as not to exceed the heat resistance upper limit. Consequently, the elements constituting the control unit 12 can be prevented from being burnt out.

Moreover, with the above process, the control logic of the heat generation management unit 15 can be simplified. Furthermore, with the above process, since the drive command is only suspended, it is possible to drive the one of the motors 11 without operating again the first operation switch SW1 or the second operation switch SW2.

Figure 8:
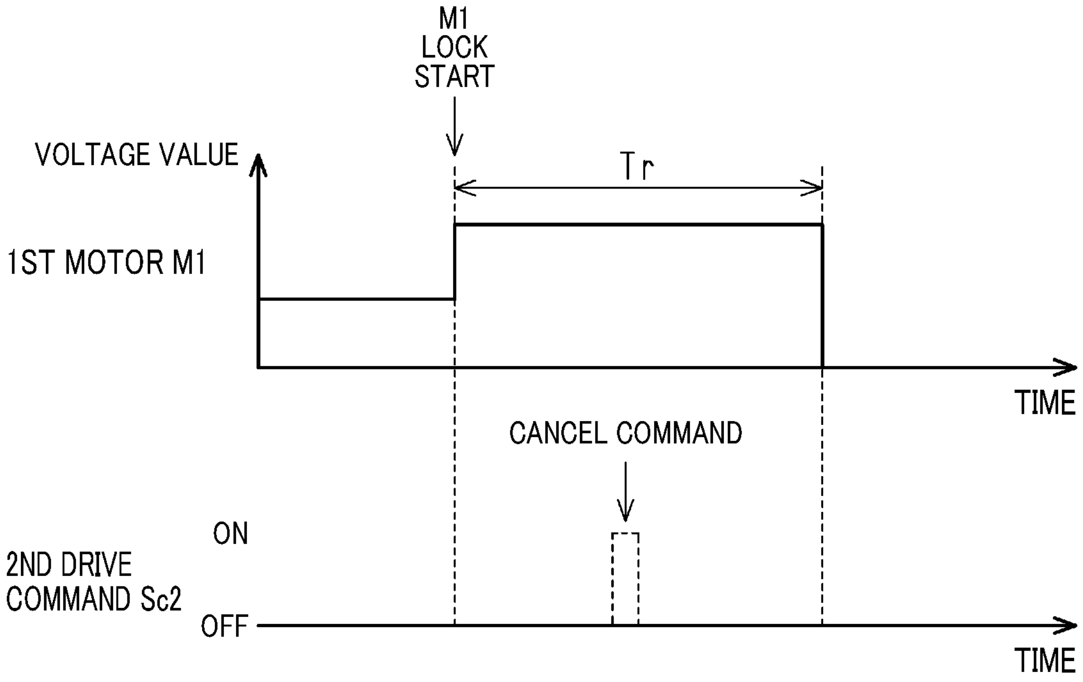
FIG. 8 is a time chart for explaining a processing mode of a control unit according to another modification.

The process performed by the heat generation management unit 15 is not limited to the processes according to the above-described embodiments, and can be modified to other modes. For example, the process may be modified so that as shown in FIG. 8, when a drive command for one of the motors 11 is detected during the drive of another one of the motors 11 which is the locked state, the drive command is canceled. FIG. 8 illustrates, as an example, the modified process performed by the heat generation management unit 15 when the second drive command Sc2 is inputted during the lock of the first motor M1. As shown in the figure, when the second drive command Sc2 for the second motor M2 is detected during the lock of the first motor M1, the heat generation management unit 15 cancels the second drive command Sc2. With the modified process, during the lock of one of the motors 11, drive of a further one of the motors 11 is not started. Consequently, the control logic of the heat generation management unit 15 can be simplified; and the temperature of the elements constituting the control unit 12 can be controlled so as not to exceed the heat resistance upper limit.

In the above-described embodiments, explanation is given taking the system, in which the plurality of power window motors are controlled by the single motor control apparatus 10, as an example. However, the present disclosure is not limited to such a system. For example, the present disclosure can also be applied to a motor control apparatus 10 that controls a plurality of other motors installed in a vehicle.

In the above-described embodiments and modifications, the number of motors 11 that can be controlled by the control unit 12 is not limited to two. That is, the present disclosure can also be applied to a control unit 12 that can control three or more motors 11. For example, the present disclosure may be applied to a control unit 12 that controls four power window motors installed in a vehicle.

It should be noted that the expression "at least one of A and B" in the present disclosure should be understood as meaning "only A, only B, or both A and B".

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A motor control apparatus comprising a controller with a microcomputer, wherein the controller is configured to control drive of each of a plurality of motors based on electric power supply from an electric power source;

control the drive of each of the plurality of motors so that a temperature of elements of the controller does not exceed a heat resistance upper limit;

detect lock of the motors based on drive information of the motors; and when the lock of two or more of the motors has been detected, limit a lock time that is a drive time of these motors in a locked state;

calculate a heat generation level value based on the lock time of each of those motors whose lock has been detected; and when the heat generation level value has become greater than or equal to a preset allowable time, stop the drive of at least one of those motors whose lock has been detected; and when the heat generation level value has become greater than or equal to the allowable time, the controller continues only the drive of the motor whose lock was detected last among those motors whose lock has been detected, and stops the drive of the remainder of those motors whose lock has been detected.

2. A motor control apparatus comprising a controller with a microcomputer, wherein the controller is configured to control drive of each of a plurality of motors based on electric power supply from an electric power source;

control the drive of each of the plurality of motors so that a temperature of elements of the controller does not exceed a heat resistance upper limit;

detect lock of the motors based on drive information of the motors; and when the lock of two or more of the motors has been detected, limit a lock time that is a drive time of these motors in a locked state;

calculate a heat generation level value based on the lock time of each of those motors whose lock has been detected; and when the heat generation level value has become greater than or equal to a preset allowable time, stop the drive of at least one of those motors whose lock has been detected; and detect the number of the motors in the locked state, and decrease the allowable time with increase in the number of the motors in the locked state.

* * * * *